Sept. 18, 1951  K. KUMMERLEN  2,568,343
BRAKE FOR PRINTING PRESS DUCTOR ROLLS
Filed June 19, 1948
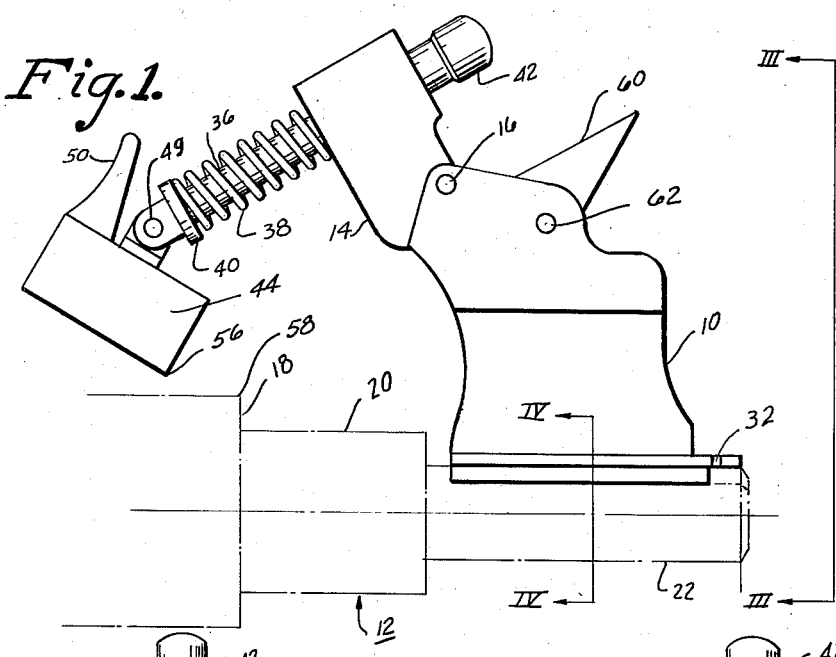
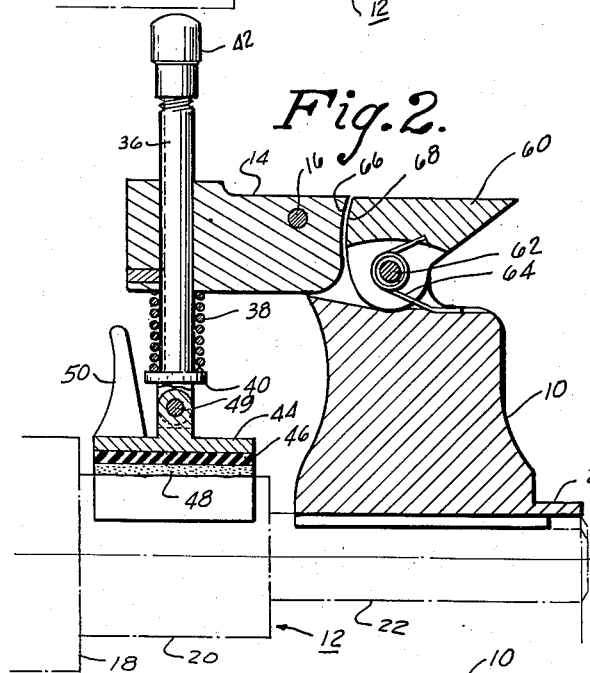
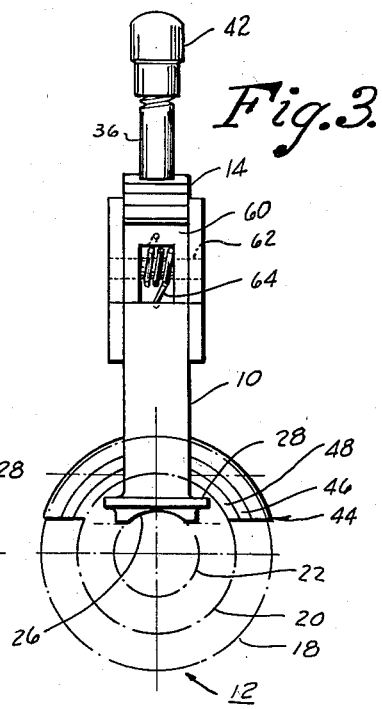
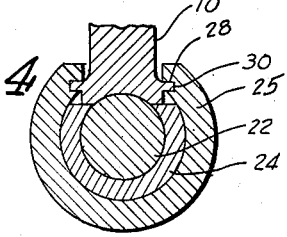
INVENTOR.
Karl Kummerlen
BY
Louis Necho
ATTORNEY

Patented Sept. 18, 1951

2,568,343

UNITED STATES PATENT OFFICE 2,568,343

BRAKE FOR PRINTING PRESS DUCTOR ROLLS

Karl Kummerlen, Philadelphia, Pa., assignor to Roland E. Sleight, Philadelphia, Pa.

Application June 19, 1948, Serial No. 33,993

1 Claim. (Cl. 101—348)

In printing presses of the type which employ a reciprocating flat bed and a ductor roll for transferring ink from the fountain roll to the bed, it is customary to use a brake for preventing, or for reducing, or for regulating, the rotary movement imparted to the freely rotatable ductor roll as a result of its contact with the reciprocating flat bed. The reasons for using such brake are now too well known in the art to require detailed exposition in the present application. See, for example, such patents as Miehle No. 650,853 of June 5, 1900, Dennis No. 2,178,740 of Nov. 7, 1939 and Dudley No. 2,239,168 of April 22, 1941.

The object of the invention is to produce an improved ductor roll brake of the type referred to.

The structure and advantages of the invention will be understood from the following specification and the accompanying drawing in which Fig. 1 is a side elevational view of a brake embodying the invention, the same being shown in its nonengaging position, certain parts being omitted.

Fig. 2 is a vertical sectional view of Fig. 1 with the brake shown in engaging position.

Fig. 3 is an end elevation looking in the direction of line 3—3 on Fig. 1.

Fig. 4 is a section on line 4—4 on Fig. 1.

A brake embodying the invention includes a body member 10 adapted to be mounted adjacent one end of a ductor roll, generally referred to by the numeral 12, and a movable arm 14 which is hinged to the body member 16 and which carries means for applying pressure to the ductor roll in a manner hereinafter more fully described.

The ductor roll 12 includes a relatively soft outer padding 18 (for transferring ink from the ink roll not shown, to reciprocating flat bed of a printing press, also not shown) and a supporting shaft 20 having a reduced end portion 22. The reduced end portion 22 of the ductor roll shaft is journalled in a lower bearing 24 which is carried by a support 25. The support 25 is carried by a hinged member, not shown, and means, also, not shown, is provided for reciprocating the ductor roll between the ink, or fountain roll and the reciprocating flat bed of the printing press. For specific examples of the manner in which the ductor roll may be reciprocated reference may be had to the patents above mentioned.

The body member or pedestal 10 of the brake is provided with a concave portion 26, which forms an upper bearing for the reduced end 22 of the ductor roll shaft, and with lateral flanges 28 which are adapted to engage slots 30 formed in the vertical walls of the lower bearing support 25 as best shown in Fig. 4. One or both of the flanges 28 may be provided with a notch 32 adapted to be engaged by a pawl, or the like, not shown, to prevent unintended movement of the brake relative to the ductor roll shaft 20. It will be noted that when the brake is in the position illustrated, the concaved underside 26 of the brake and the bearing 24 coact to provide a complete and satisfactory bearing for the reduced end 22 of the shaft 20. This is best seen in Fig. 4.

The pressure applying mechanism includes a stem 36 which passes through a guide aperture in the hinged arm 14 and which is tensioned downwardly by a spring 38 confined between the underside of the arm 14 and a collar 40 carried by the lower end of the stem. The stem 36 is provided with an enlarged head 42 which is too large to pass through the guide opening in the arm 14 and thus limits the movement of the stem, downwardly, as viewed in the drawings, relative to the hinged arm 14.

The pressure applying mechanism further includes a curved shoe 44 which is provided, on its underside, with a cushion 46 and a friction member 48 for engaging the shaft 26 as shown in Fig. 2. The shoe 44 is pivoted at 49 to the lower end of the stem 36 and is provided with a finger piece 50.

To apply the brake to the ductor roll, the left hand ends of the flanges 28 are inserted in the right hand ends of the slots 30 and the brake is moved from the right to left until it reaches the position shown in Figs. 1 and 2. It will be noted that while the brake is being applied to the shaft, the stem 36 is in the position in Fig. 1 in which the lowermost edge 56 of the shoe 44 clears the uppermost edge 58 of the ductor roll padding 18.

To move the stem 36 from the idle position of Fig. 1 to the effective position of Fig. 2, the finger piece 50 is pulled upwardly to raise the shoe 44, against the action of the spring 38 enough to clear the upper edge 58 of the padding 18. Simultaneously, the pivoted arm 14 is rotated in counterclockwise direction until it reaches the position of Fig. 2 in which the stem 36 is substantially vertical. In this position, the underside of the shoe 44 is parallel to, and contacts the shaft 20 with a pressure determined by the strength of the spring 38. The pressure of the spring 38 is such as to permit slow and limited rotation of the ductor roll as a result of its engagement with the reciprocating bed of the press.

In order to prevent unintended movement of the stem 36 and the shoe 44 from the engaging position of Fig. 2 to the idle position of Fig. 4, I provide a finger piece 60 which is pivoted at 62 to the upper portion of the pedestal 10 and which is tensioned into the position of Fig. 2 by a spring 64. The finger piece 60 is provided with a curved surface 68 which is adapted to coact with a similar surface 66 on the adjacent portion of the hinged arm 14, as best shown in Fig. 1.

Any upward movement of the stem 36 in response to the action of the spring 38 will tend to rotate the arm 14 in clockwise direction and will thus cause the upper edge of the surface 66 to bear on the corresponding portion of the surface 68, with a force component exerted in the direction of a line passing through the pivot 62 and the contact point of surfaces 66 and 68. The fixed pivot 62 resists this force and thus prevents upward movement of the stem and the brake will remain as shown in Fig. 2. To disengage the brake, the right hand end of the finger piece 60 is depressed so as to move the surface 68 out of the path of movement of the surface 66. When this is done, the stem 36, under action of the spring 38, will move to the position of Fig. 1 and the brake may now be moved horizontally to the right until the flanges 28 clear the slots 30.

When a ductor roll is restrained by the brake illustrated and in the manner shown, it will, upon contact with the reciprocating bed of the press, acquire a rotary movement, about its axis and the pressure of the shoe 44 is such as to permit such rotation. However, the restraining action of the shoe is such that, by the time the ductor roll reaches the fountain roll, it is either not rotating at all or it is rotating very slowly. This restrained rotation permits the ductor roll to present different portions thereof to the fountain roll at each stroke or reciprocation, thus avoiding non-uniform wear on the surface of the roll, and because the rotation is restrained no damage results from the contact of the ductor roll with the fountain roll. Conventionally, the fountain roll is turned about its axis by a ratchet mechanism so as to present different portions of its surface, successively, to the ductor roll, upon each stroke or reciprocation of the ductor roll.

What I claim is:

A brake for a flat bed printing press of the type which includes a shaft, a ductor roll carried by said shaft and adapted, alternately, to contact the fountain roll and the reciprocating bed of such printing press, said brake including a vertically disposed pedestal, an arm pivoted at one end thereof to the top of said pedestal and movable to a first position in which it is disposed horizontally and extends laterally with respect to the top of the pedestal and to a second position in which the horizontal axis of said arm form an acute angle with the vertical axis of said pedestal, a vertical stem passing through the end of said arm remote from said pedestal, a shoe hinged to the lower end of said stem and adapted to engage said shaft, a spring between said shoe and said end of said stem tending to bias said shoe towards said shaft and to bias said arm to its second position, a finger piece pivoted to the top of said pedestal and movable to a first position in which it is close to and prevents movement of said arm toward its second position, said finger piece being movable to a second position in which it is out of the path of movement of said arm, and a spring between said finger piece and the top of said pedestal for biasing said finger piece to its first position.

KARL KUMMERLEN.

REFERENCES CITED

The following references are of record in the file of this patent:

UNITED STATES PATENTS

| Number | Name | Date |
| --- | --- | --- |
| 1,700,917 | Weirich | Feb. 5, 1929 |
| 2,459,189 | Schultz | Jan. 18, 1949 |